(12) United States Patent
Damnjanovic et al.

(10) Patent No.: US 9,209,933 B2
(45) Date of Patent: Dec. 8, 2015

(54) METHOD AND APPARATUS FOR DISPATCHING A CHANNEL QUALITY INDICATOR FEEDBACK IN MULTICARRIER SYSTEM

(75) Inventors: Jelena M. Damnjanovic, Del Mar, CA (US); Juan Montojo, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 651 days.

(21) Appl. No.: 12/813,451

(22) Filed: Jun. 10, 2010

(65) Prior Publication Data

US 2011/0141926 A1  Jun. 16, 2011

Related U.S. Application Data

(60) Provisional application No. 61/186,329, filed on Jun. 11, 2009.

(51) Int. Cl.
*H04L 1/00* (2006.01)
*H04L 5/00* (2006.01)
*H04L 27/26* (2006.01)

(52) U.S. Cl.
CPC ............ *H04L 1/0026* (2013.01); *H04L 1/0027* (2013.01); *H04L 5/0005* (2013.01); *H04L 5/0053* (2013.01); *H04L 27/2647* (2013.01); *H04L 1/0029* (2013.01); *H04L 27/2614* (2013.01)

(58) Field of Classification Search
None
See application file for complete search history.

(56) References Cited

U.S. PATENT DOCUMENTS

| 8,285,295 | B2 * | 10/2012 | Westerberg et al. ......... 455/450 |
| 2004/0264507 | A1 | 12/2004 | Cho et al. |
| 2005/0068990 | A1 | 3/2005 | Liu |
| 2005/0207367 | A1 * | 9/2005 | Onggosanusi et al. ....... 370/315 |

(Continued)

FOREIGN PATENT DOCUMENTS

| JP | 2008072275 A | 3/2008 |
| JP | 2008306732 A | 12/2008 |

(Continued)

OTHER PUBLICATIONS

3rd Generation Partnership Project, Technical Specification Group Radio Access Network, Evolved Universal Terrestrial Radio Access (E-UTRA), Physical layer procedures (Release 8) 3GPP Standard, 3GPP TS 36.213, 3rd Generation Partnership Project (3GPP), Mobile Competence Centre, 650, Route Des Lucioles, F06921 Sophia-Antipolis Cedex, France, No. V8.3.0, May 1, 2008, pp. 1-47, XP050377558, p. 27, paragraph 7.2.1, tables 7.2.1-1.

(Continued)

*Primary Examiner* — Hicham Foud
(74) *Attorney, Agent, or Firm* — Paul Kuo (57) ABSTRACT

In accordance with one or more aspects and corresponding disclosure thereof, various aspects are described in connection with channel quality indicator (CQI) feedback in connection with one or more downlink carriers. An anchor carrier scheme is employed to provide channel quality indicator (CQI) feedback of one or more downlink carriers. An indication is set to identify that a designated uplink carrier is used to convey the CQI feedback. An uplink carrier is selected from a set of uplink carriers as an anchor carrier to convey the CQI feedback. CQI feedback is transmitted for one or more downlink carriers using the designated carrier.

33 Claims, 8 Drawing Sheets

(56) References Cited

U.S. PATENT DOCUMENTS

| | | | |
|---|---|---|---|
| 2006/0274612 A1 | 12/2006 | Kim | |
| 2006/0274712 A1 | 12/2006 | Malladi et al. | |
| 2007/0026813 A1* | 2/2007 | Khan | 455/69 |
| 2008/0153506 A1* | 6/2008 | Yin et al. | 455/452.2 |
| 2008/0253336 A1 | 10/2008 | Parkvall et al. | |
| 2009/0111475 A1* | 4/2009 | Yang et al. | 455/450 |
| 2010/0002664 A1* | 1/2010 | Pan et al. | 370/338 |
| 2010/0020732 A1* | 1/2010 | Gaddam et al. | 370/310 |
| 2010/0034114 A1* | 2/2010 | Kim et al. | 370/252 |
| 2010/0113078 A1* | 5/2010 | Farajidana et al. | 455/507 |
| 2011/0110246 A1 | 5/2011 | Damnjanovic et al. | |
| 2011/0158123 A1 | 6/2011 | Kim et al. | |
| 2011/0286541 A1* | 11/2011 | Chun et al. | 375/260 |

FOREIGN PATENT DOCUMENTS

| | | |
|---|---|---|
| KR | 20090054878 A | 6/2009 |
| RU | 2289210 C2 | 12/2006 |
| RU | 2348109 C2 | 2/2009 |
| WO | WO 2006051372 | 5/2006 |
| WO | 2007035047 A2 | 3/2007 |
| WO | 2007089126 A2 | 8/2007 |
| WO | 2007141105 A1 | 12/2007 |
| WO | 2008088254 A1 | 7/2008 |

OTHER PUBLICATIONS

Huawei: "PUCCH design for carrier aggregation" 3GPP Draft; RI-090813, 3RD Generation Partnership Project (3GPP), Mobile Competence Centre ; 650, Route Des Lucioles ; F-06921 Sophia-Antipolis Cedex ; France, No. Athens, Greece; Feb. 3, 2009, XP050318670 [retrieved on Feb. 2, 2009] p. 1, paragraph 1—p. 3, paragraph 3.2; figures 1-2 p. 5, paragraph 3.2.3.
International Search Report and Written Opinion—PCT/US2010/038424, International Search Authority—European Patent Office—Mar. 4, 2011.
Na Wei, et al., "Mitigating Signaling Requirements For MIMO with Frequency Domain Packet Scheduling", IEEE VTS Vehicular Technology Conference, Proceedings, IEEE, US, Apr. 1, 2007, pp. 2771-2775, XP031093135, ISSN, 1550-2252 ISBN, 978-1-4244-0266-3 p. 2771, left-hand column, paragraph Abstract—p. 2773, right-hand column, paragraph III.C, figures 1,2,3.
Partial International Search Report—PCT/US2010/038424—International Search Authority, European Patent Office,Oct. 5, 2010.
Philips et al., "Control channel support for HSDPA Dual-Cell operation", 3GPP Draft, R1-082532, 3rd Generation Partnership Project (3GPP), Mobile Competence Centre, 650, Route Des Lucioles, F-06921 Sophia-Antipolis Cedex, France, vol. RAN WGI, No. Warsaw, Poland, Jun. 26, 2008, XP050110797, [retrieved on Jun. 26, 2008].
Philips et al., "CQI definition for MU-MIM0", 3GPP Draft, R1-082531, 3rd Generation Partnership Project (3GPP), Mobile Competence Centre, 650, Route Des Lucioles, F-06921 Sophia-Antipolis Cedex, France, vol. RAN WGI, No. Warsaw, Poland, Jun. 25, 2008, XP050110796, [retrieved on Jun. 25, 2008] p. 1 p. 6, paragraph 7.2.1, tables 7.2.1-1.
Qualcomm Europe: "CQI Feedback for Multicarrier Operation" 3GPP Draft; R1-092708 CQI for MC, 3rd Generation Partnership Project (3GPP), Mobile Competence Centre ; 650, Route Des Lucioles ; F-06921 Sophia-Antipolis Cedex ; France, No. Los Angeles, USA; Jun. 24, 2009, XP050351179 [retrieved on Jun. 24, 2009] the whole document.
Texas Instruments, "UE-Selected Sub-band CQI Feedback for E-UTRA", 3GPP Draft, R1-074693 TI CQI Selected Subband, 3rd Generation Partnership Project (3GPP), Mobile Competence Centre, 650, Route Des Lucioles, F-06921 Sophia-Antipolis Cedex, France, vol. RAN WGI, No. Korea, Oct. 30, 2007, XP050108168, [retrieved on Oct. 30, 2007] p. 1, paragraph 1—p. 2, paragraph 2.3.
Huawei: "PUCCH design for carrier aggregation", 3GPP Draft; R1-091810, 3rd Generation Partnership Project (3GPP), Mobile Competence Centre ; 650, Route Des Lucioles ; F-06921 Sophia Antipolis Cedex ; France, No. San Francisco, USA; Apr. 28, 2009, XP050339324, [retrieved on Apr. 28, 2009].
Taiwan Search Report—TW099119232—TIPO—Jun. 21, 2013.
3rd Generation Partnership Project: "3GPP TS 36.213 V8.4.0 Technical Specification Group Radio Access Network; Evolved Universal Terrestrial Radio Access (E-UTRA); Physical layer procedures (Release 8)" [Online] Sep. 1, 2008, pp. 1-60, XP002581188 Retrieved from the Internet: URL:http://www.3gpp.org/ftp/Specs/archive/36_series/36.213/36213-840.zip> [retrieved on May 6, 2010] p. 30-p. 32.
LG Electronics: "Some Aspects of PUCCH/PUSCH Transmission Over Multiple Component Carriers", 3GPP Draft; R1-090208 LTEA_UL Transmission, 3rd Generation Partnership Project (3GPP), Mobile Competence Centre ; 650, Route Des Lucioles ; F-06921 Sophia-Antipolis Cedex ; France, No. Ljubljana; Jan. 7, 2009, XP050318139.
ZTE: "Uplink Control Channel Design for LTE-Advanced", 3GPP Draft; R1-091427 Uplink Control, Channel Design for LTE-A, 3rd Generation Partnership Project (3GPP), Mobile Competence Centre ; 650, Route Des Lucioles ; F-06921 Sophia-Antipolis Cedex ; France, No. Seoul, Korea; Mar. 17, 2009, XP050339006, [retrieved on Mar. 17, 2009].
Sharp: "Impact of the PMI/RI Report Drop on the PUCCH CQI Report," 3GPP TSG RAN WG1 Meeting #53bis, R1-082273, Jun. 30-Jul. 4, 2008, 4 pages.

* cited by examiner

METHOD AND APPARATUS FOR DISPATCHING A CHANNEL QUALITY INDICATOR FEEDBACK IN MULTICARRIER SYSTEM

CROSS-REFERENCE

This application claims the benefit of U.S. Provisional Application Ser. No. 61/186,329, filed Jun. 11, 2009, entitled "CQI FEEDBACK FOR MULTICARRIER SYSTEM," and assigned to the assignee hereof the entirety of which is incorporated herein by reference.

BACKGROUND

Field

The present disclosure pertain to wireless communication systems, and in particular, to multicarrier system(s) that benefit from efficient method(s) of channel quality indicator (CQI) feedback.

Wireless communication systems are widely deployed to provide various communication content such as for example: voice, video, packet data, messaging, broadcast, etc. These wireless systems may be multiple-access systems capable of supporting multiple users by sharing available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

Generally, a wireless multiple-access communication system can concurrently support communication for multiple wireless terminals. Each terminal can communicate with one or more base stations via transmissions on forward and reverse links. The forward link (or downlink) refers to the communication link from base stations to terminals, and the reverse link (or uplink) refers to the communication link from terminals to base stations. This communication link can be established for example via a single-in-single-out, multiple-in-signal-out or a multiple-in-multiple-out (MIMO) system.

A wireless system may support operation on multiple carriers. A carrier may refer to a range of frequencies used for communication and may be associated with certain characteristics. For example, a carrier may carry synchronization signals, or may be associated with system information describing operation on the carrier, etc. A carrier may also be referred to as a channel, a frequency channel, etc. A base station may send data on one or more carriers on the downlink to user equipment (UE). The UE may send feedback information on the uplink to support data transmission on the downlink. It may be desirable to efficiently uplink carriers to send the feedback information to the base station.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with channel quality indicator (CQI) feedback in connection with one or more downlink carriers.

It is to be appreciated that although various embodiments are described herein with respect to channel quality indicator (CQI), it is to be appreciated that such embodiments are intended to include employment of precoding matrix index (PMI), rank indicator (RI), CQI, or a combination thereof.

Furthermore, the term subset as employed herein is intended to cover the range of a portion of the set to all of the set.

In one aspect, an apparatus is employed in a wireless communication using a multicarrier system, the apparatus comprising: means for using an anchor carrier scheme to provide channel quality indicator (CQI) feedback of one or more downlink carriers; means for selecting an uplink carrier from a set of uplink carriers as an anchor carrier to convey the CQI feedback; and means for transmitting the CQI feedback for one or more downlink carriers using the designated carrier.

In another aspect, a method for use in a wireless communication using a multicarrier system, comprises: using an anchor carrier scheme to provide channel quality indicator (CQI) feedback of one or more downlink carriers; setting an indication to identify that a designated uplink carrier is used to convey the CQI feedback; selecting an uplink carrier from a set of uplink carriers as an anchor carrier to convey the CQI feedback; and transmitting the CQI feedback for one or more downlink carriers using the designated carrier.

In yet another aspect, an apparatus used in a wireless communication using a multicarrier system, comprises: at least one processor configured to use a anchor carrier scheme to provide channel quality indicator (CQI) feedback of one or more downlink carriers, to set an indication to indicate that a designated uplink carrier is used to convey the CQI feedback, to select a uplink carrier from a set of uplink carriers as an anchor carrier to convey the CQI feedback, and to transmit the CQI feedback for one or more downlink carriers using the designated carrier.

Another aspect provides for a computer program product, comprising: a computer-readable medium comprising: code for using an anchor carrier scheme to provide a channel quality indicator (CQI) feedback of one or more downlink carriers; code for setting an indication to indicate that a designated uplink carrier is used to convey the CQI feedback; code for selecting a uplink carrier from a set of uplink carriers as an anchor carrier to convey the CQI feedback; and code for transmitting the CQI feedback for one or more downlink carriers using the designated carrier.

In an aspect, an apparatus used in a wireless communication using a multicarrier system, comprises: means for determining if an asymmetric configuration is used, wherein a designated uplink carrier is employed to provide channel state information regarding one or more downlink carrier; and means for providing an indication that the asymmetric configuration is used.

In another aspect, a method that effectuates dispatch of a channel quality indicator (CQI) feedback for multicarrier systems, comprises: determining an offset or a periodicity to ensure that channel quality indicator (CQI) reports are not conveyed in a same subframe; ascertaining whether an access terminal is power limited; and based at least in part on the ascertaining, providing channel quality indicator (CQI) feedback on multiple carriers on the same subframe or ascertaining whether to drop channel quality indicator (CQI) feedback on all carriers, transmit channel quality indicator (CQI) feedback on one carrier, or transmit channel quality indicator (CQI) feedback on a subset of carriers.

In an aspect, an apparatus that effectuates dispatch of a channel quality indicator (CQI) feedback for multicarrier systems, comprises: means for determining an offset or a periodicity to ensure that channel quality indicator (CQI) reports are not conveyed in a same subframe; means for ascertaining whether an access terminal is power limited; and means for providing, based at least in part on the ascertaining, channel quality indicator (CQI) feedback on multiple carriers on the same subframe or ascertaining whether to drop channel quality indicator (CQI) feedback on all carriers, transmit channel quality indicator (CQI) feedback on one carrier, or transmit channel quality indicator (CQI) feedback on a subset of carriers.

In still another aspect, an apparatus that effectuates dispatch of a channel quality indicator (CQI) feedback for multicarrier systems, comprises: at least one processor configured to determine an offset or a periodicity to ensure that channel quality indicator (CQI) reports are not conveyed in a same subframe, to ascertain whether an access terminal is power limited, and to provide, based at least in part on the ascertaining, channel quality indicator (CQI) feedback on multiple carriers on the same subframe or ascertaining whether to drop channel quality indicator (CQI) feedback on all carriers, transmit channel quality indicator (CQI) feedback on one carrier, or transmit channel quality indicator (CQI) feedback on a subset of carriers.

In an aspect, a method that effectuates dissemination of channel quality indicator (CQI) feedback for multicarrier systems, comprises: analyzing transmission modes of downlink (DL) carriers and identifying carriers that can be grouped; conveying configuration parameters for CQI feedback for each group, and carriers that belong to respective group(s); cycling over the CQI feedbacks of the carriers from each group; and grouping channel quality indicator (CQI) feedback based at least in part on a transmission mode associated with a corresponding downlink (DL) carrier; and based at least in part on a rank indicator collision, wideband channel quality indicator or subband channel quality indicator (CQI) feedback on a same carrier, dropping channel quality indicator (CQI) feedback.

In another aspect, a wireless communications apparatus, comprises: a processor configured to: analyze transmission modes of downlink (DL) carriers and identifying carriers that can be grouped; convey configuration parameters for CQI feedback for each group, and carriers that belong to respective group(s); cycle over the CQI feedbacks of the carriers from each group; group channel quality indicator (CQI) feedback based at least in part on a transmission mode associated with a corresponding downlink (DL) carrier; and drop channel quality indicator (CQI) feedback based at least in part on a rank indicator collision, wideband channel quality or subband channel quality indicator (CQI) feedback on a same carrier.

In another aspect, a wireless communications apparatus that effectuates dissemination of channel quality indicator (CQI) feedback for multicarrier systems, comprises: means for analyzing transmission modes of downlink (DL) carriers and identifying carriers that can be grouped; means for conveying configuration parameters for CQI feedback for each group, and carriers that belong to respective group(s); means for cycling over the CQI feedbacks of the carriers from each group; means for grouping channel quality indicator (CQI) feedback based at least in part on a transmission mode associated with a corresponding downlink (DL) carrier; and means for dropping channel quality indicator (CQI) feedback based at least in part on a rank indicator collision, wideband channel quality or subband channel quality indicator (CQI) feedback on a same carrier.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station can be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The word "exemplary" is used herein to mean serving as an example, instance, or illustration. Any aspect or design described herein as "exemplary" is not necessarily to be construed as preferred or advantageous over other aspects or designs.

Additionally, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Figure 2:
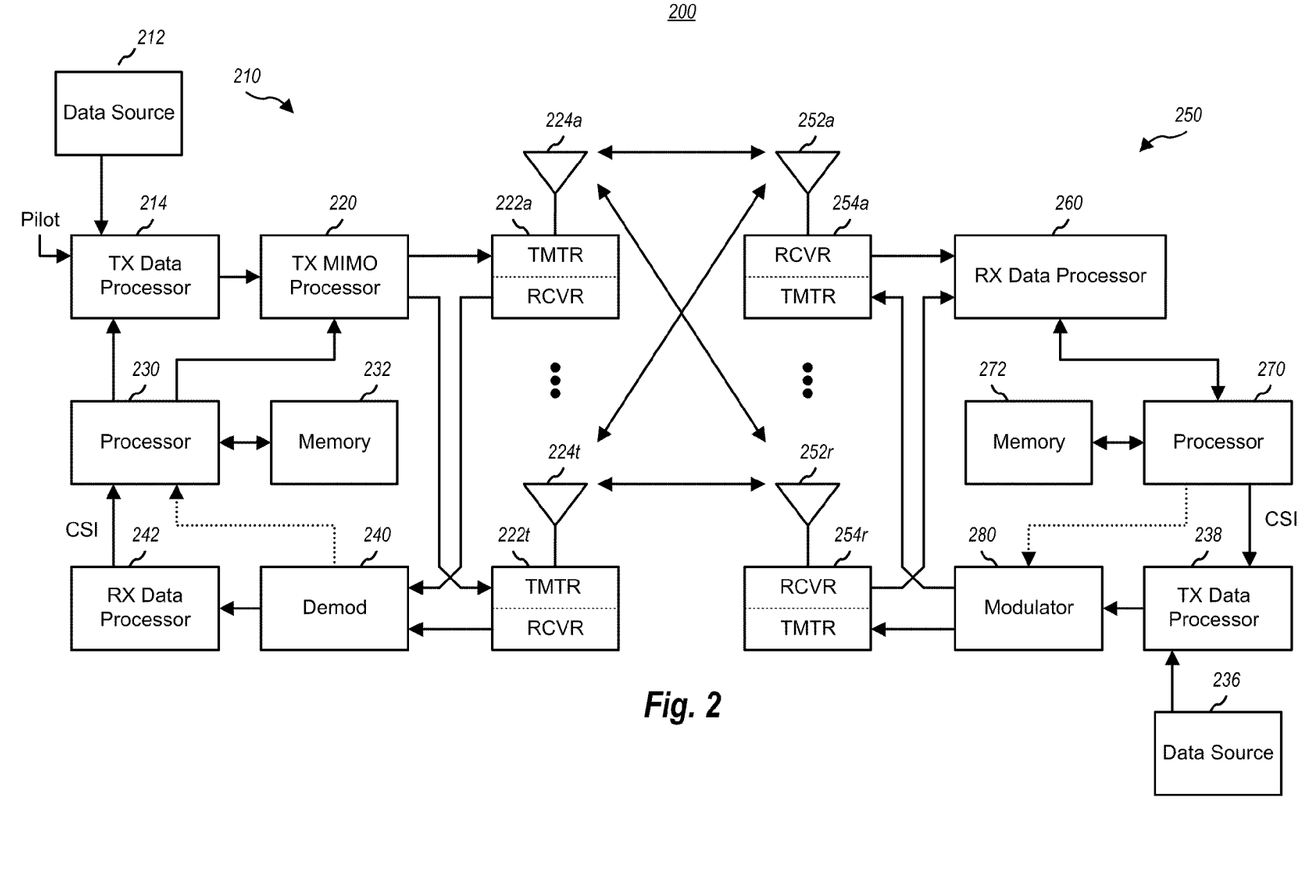
FIG. 2 illustrates a block diagram of a communication system.

FIG. 2 is a block diagram of an embodiment of a transmitter system 210 (also known as the access point, base station and eNodeB) and a receiver system 250 (also known as access terminal and user equipment) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 1:
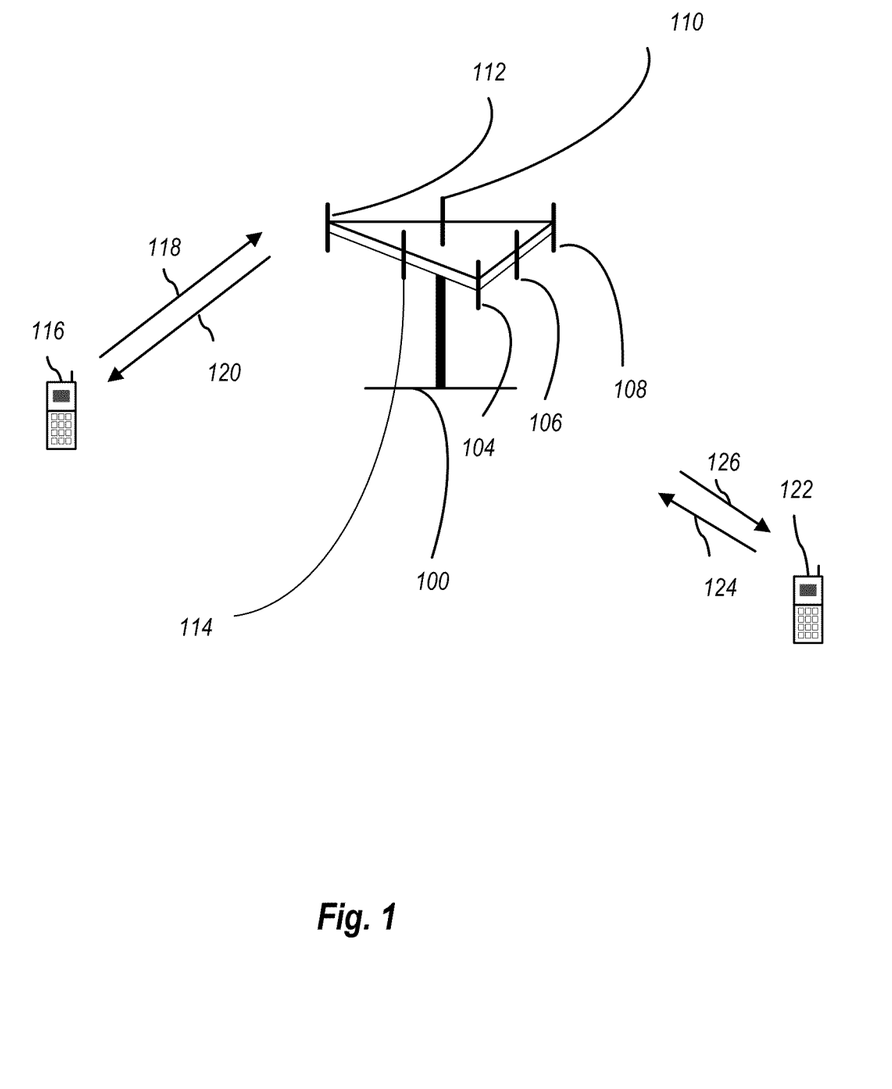
FIG. 1 illustrates a multiple access wireless communication system according to one embodiment.
Figure 3A:
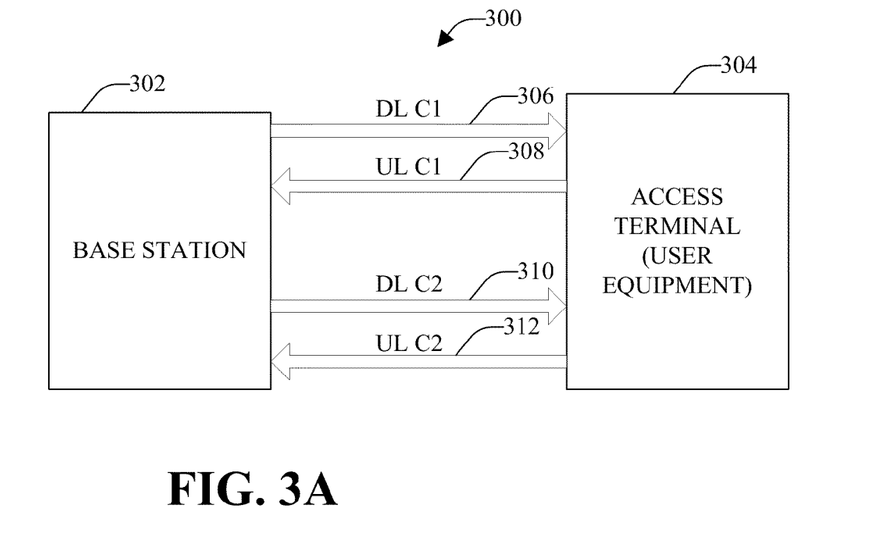
FIG. 3A illustrates a multicarrier system that is symmetrically configured.

FIG. 3A illustrates a multicarrier system 300 with symmetric configuration, which includes downlink carriers (DL CL1 and DL CL2) 306 and 310 and uplink carriers (UL CL1 and UL CL2) 308 and 312. These carriers are used to exchange information between base station 302 and access terminal 304. Base station 302 and access terminal 304 correspond to base station 100 and access terminal 116 shown in FIG. 1. The system 300 is symmetric in the that the number of downlink carriers 306 and 310 are equal to the number of uplink carriers 308 and 312 and that downlink carrier 306 is paired with uplink carrier 308 and downlink carrier 310 is paired with uplink carrier 312. Although only two downlink and two uplink carriers are shown, the system 300 can be configured to include any suitable number of downlink and uplink carriers.

Figure 3B:
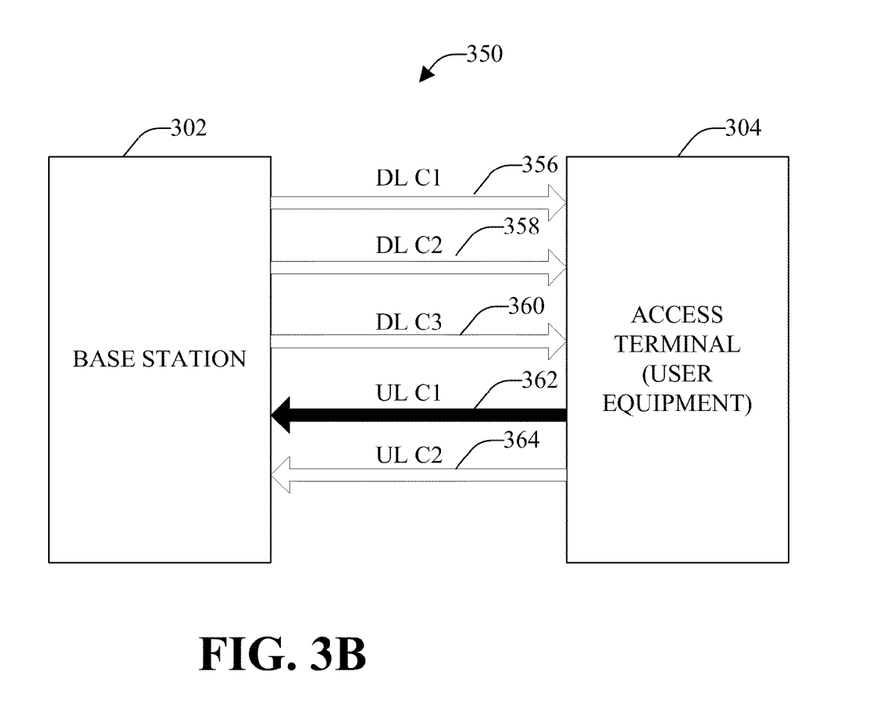
FIG. 3B illustrates a multicarrier system that is asymmetrically configured.

FIG. 3B illustrates multicarrier system 350 with asymmetric configuration, which includes downlink carriers (DL CL1, DL CL2 and DL CL3) 356, 358 and 360 and uplink carriers (UL CL1 and UL CL2) 362 and 364. These carriers are used to exchange information between base station 302 and access terminal 304. The system is asymmetric in that the number of downlink carriers 356, 358 and 360 are equal to the number of uplink carriers 362 and 364. In an asymmetric system configuration, the number of downlink carriers is not equal to the number of uplink carrier and the downlink carriers are not necessarily paired with uplink carriers. In an aspect, one or more downlink carriers are be paired with only one uplink carrier (also referred to as uplink anchor carrier shown as darkened uplink carrier 362). Although only three downlink and two uplink carriers are shown, the system 350 can be configured to include any suitable number of downlink and uplink carriers.

In an aspect, for the multicarrier system asymmetrically configured, one or more downlink carriers and one or more uplink carriers communicate information between base station 302 and access terminal 304. At various times during operation of the system 350, the access terminal 304 generates channel state information reports for each of the downlink carriers. The scheduling regarding when reports are to be provided or transmitted to the base station 302 can be system specific or base station specific. The reports generally include channel state information, comprising channel quality indicator (CQI) feedback regarding each downlink carrier. The base station can employ this information for scheduling purposes. In an aspect, the access terminal 304 uses one uplink carrier (referred to as the anchor carrier) to provide CQI feedback for each downlink carrier used by the system. The selection of which uplink carrier to utilize (for example, UL C1 or UL C2 of FIG. 3) may be static, semi-static or dynamic based on the system configuration. This decision may be based on various factors, such as system implementation, channel conditions, loading information or interference levels of uplink carriers. For semi-static and dynamic configurations, the anchor carrier may be selected by signaling, by the base station 302, to access terminal 304 or during a call setup or initial acquisition. Which uplink carrier to use may be user equipment-specific (e.g., access terminal capabilities) or system-specific (e.g., preselected by the system). In addition, it should be noted without limitation or loss of generality that it is possible to use additional uplink carriers to provide CQI feedback of one or more downlink carriers. Note that in the asymmetric configuration, the uplink carriers need not be paired with the downlink carriers.

Figure 4:
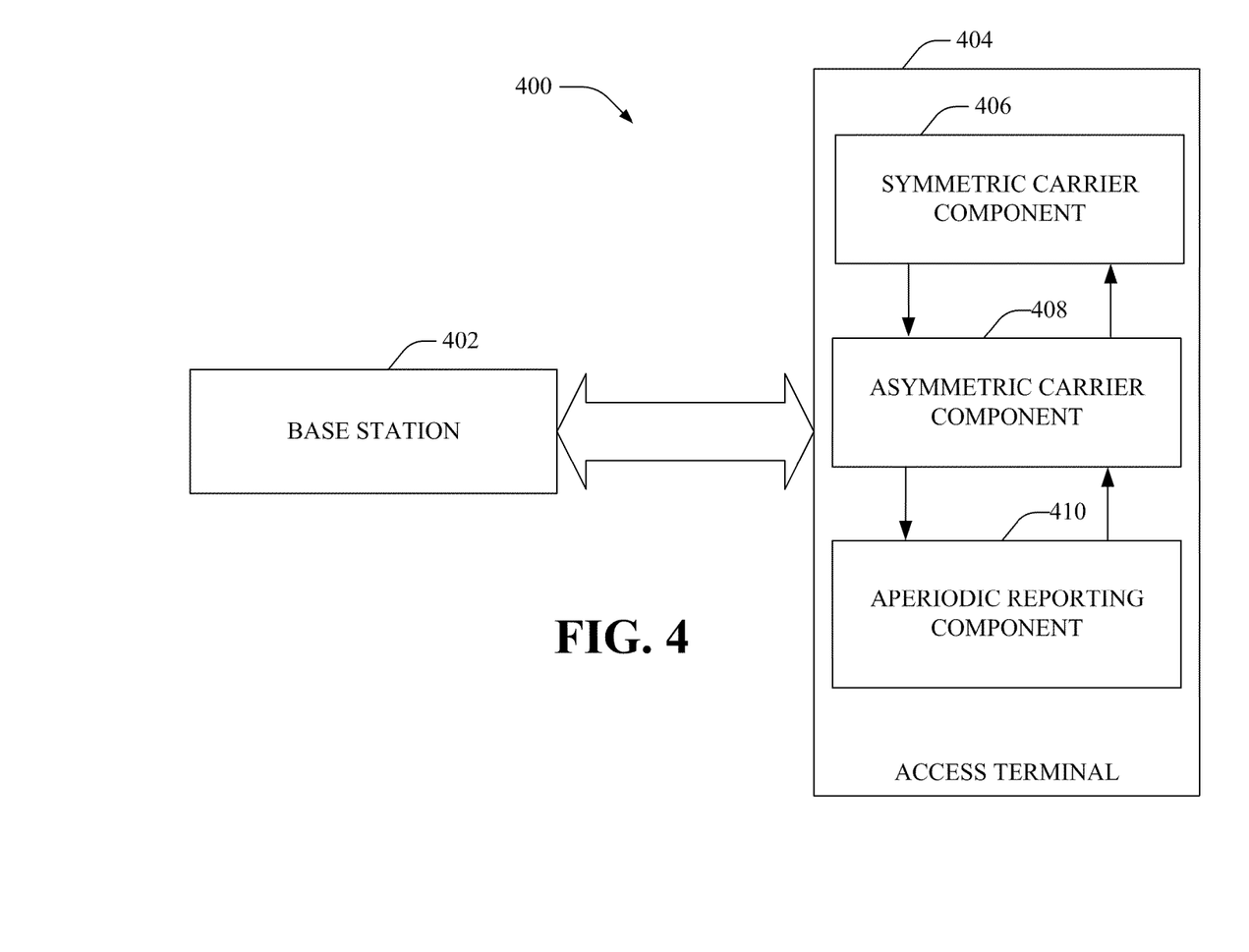
FIG. 4 illustrates an example system that provides channel quality indicator (CQI) feedback for multicarrier systems.

FIG. 4 illustrates a system 400 that provides channel quality indicator (CQI) feedback for multicarrier systems that includes access point or base station 402 which can be in continuous and/or operative, or sporadic and/or intermittent communication with access terminal or user equipment 404. The base station 402 and access terminal 404 respectively correspond to the base station 302 and access terminal 304 shown in FIGS. 3A and 3B. In accordance with various aspects of the claimed subject matter set forth herein, access terminal 404 can provide or transmit to the base station 402 channel quality indicator (CQI) feedback for the downlink (DL) carriers (for example 356, 358 or 360 illustrated in FIG. 3B). According to an aspect, the access terminal 404 can determine channel state information (including CQI information) of each downlink carrier and use a designated or anchor uplink (UL) carrier (for example 362 illustrated in FIG. 3B) to provide the channel state information of the all the downlink carriers. The anchor carrier is not necessarily paired with any of the multiple downlink (DL) carriers for which channel quality indicator (CQI) feedback is being conveyed. Transmitting channel quality indicator (CQI) feedback on a designated or anchor uplink (UL) carrier that is not necessarily paired with the multiple downlink (DL) carriers for which channel quality indicator (CQI) feedback is being conveyed typically corresponds to a many-to-one downlink/uplink (DL/UP) mapping (e.g., asymmetric carrier configuration). Whereas transmitting the channel quality indicator (CQI) feedback on corresponding paired uplink (UL) carriers (e.g., paired with downlink (DL) carriers) can generally be perceived as being a one-to-one (e.g., symmetric carrier configuration).

In order to distinguish between the asymmetric and symmetric configuration alternatives, access terminal 404 can incorporate a flag to be used to indicate whether channel quality indicator (CQI) feedback is being sent using an anchor scheme or a non-paired scheme. The anchor scheme comprises employing a designated or anchor uplink (UL) carrier that is not necessarily paired with the multiple downlink (DL) carriers for which channel quality indicator (CQI) feedback is being conveyed. For the paired scheme, the channel quality indicator (CQI) feedback is dispatched using correspondingly paired uplink (UL) carriers (e.g., paired with downlink (DL) carriers). The flag so generated by access terminal 404 can, for example, be conveyed on the system information (common) or by radio resource control (RRC) signaling (per access terminal or user equipment (UE)). It should be noted without limitation or loss of generality that the flag can be applied to long term evolution advanced (LTE-A) access terminals or user equipment (UE) but can be transparent to legacy access terminals or user equipment since legacy access terminals or user equipment typically send downlink (DL) channel quality indicator (CQI) feedback on the paired uplink (UL). It should be also noted that base station 402 may request the access terminal, during a call setup or initial acquisition, to designate which alternative (asymmetric—designate the anchor carrier or symmetric—pairing) to employ.

Accordingly and in view of the foregoing, access terminal 404 can include symmetric carrier component 406 that can be utilized in cases where channel quality indicator (CQI) feedback is being dispatched using correspondingly paired uplink (UL) carriers. In accordance with this aspect of the claimed subject matter, symmetric carrier component 406, in order to achieve an independent channel quality indicator (CQI) configuration per carrier, preserve single carrier properties, and further to ensure that reports do not occur in the same subframe or at the very least to minimize collisions, can monitor the offset and/or periodicity of the carrier. Moreover, symmetric carrier component 406 can also ascertain whether or not access terminal 404 is power limited. A determination by symmetric carrier component 406 that access terminal 404 is not power limited can indicate that channel quality indicator (CQI) feedback can be conveyed on multiple carriers in the same subframe (NxSC-FDMA). Whereas a determination that access terminal 404 is power limited can provide indication to symmetric carrier component 406 that channel quality indicator (CQI) feedback needs to be dropped from all carriers, transmitted on one carrier, or dispatched on a subset of carriers.

Access terminal 404 can also include asymmetric carrier component 408 that can be employed in instances where a designated or anchor uplink (UL) carrier that is not necessarily paired with the multiple downlink (DL) carriers is being utilized to convey channel quality indicator (CQI) feedback for the downlink carriers. While there can be a number of contingencies that arise where the designated or anchor uplink (UL) carrier is not necessarily paired with one or more of the multiple downlink (DL) carriers, two in particular need to be addressed by asymmetric carrier component 408. Asymmetric carrier component 408 needs to address situations where more than one downlink (DL) carrier is paired with one uplink (UL) carrier, and further asymmetric carrier component 408 needs to address situations where more than one uplink (UL) carrier is paired with one downlink (DL) carrier.

Where more than one downlink (DL) carrier is paired with one uplink (UL) carrier, asymmetric carrier component 408 can cycle through the channel quality indicator (CQI) feedback for all corresponding downlink (DL) carriers. It should be noted, without limitation or loss of generality, that different carrier channel quality indicator (CQI) feedback can be configured differently, in which case upper layer configuration needs to be available for each carrier. Further, it should also be noted that the same channel quality indicator (CQI) configuration typically requires one set of configuration parameters from upper layers, and that channel quality indicator (CQI) feedback can be grouped depending on transmission mode (e.g., single input multiple output (SIMO), multiple input multiple output (MIMO), . . . ) on the corresponding carriers wherein the same channel quality indicator (CQI) configuration within a group can be applied.

Additionally, asymmetric carrier component 408, in the case of rank indicator (RI) collisions and/or wideband CQI/subband channel quality indicator (CQI) feedback on the same carrier, can drop the channel quality indicator (CQI) feedback.

It should be appreciated, once again without limitation or loss of generality, that there need not be a change in physical uplink control channel (PUCCH) channel resources for channel quality indicator (CQI) feedback. Thus, where channel quality indicator (CQI) feedback is provided in multiple input multiple output (MIMO) mode at most 11 bits can be utilized. Whereas when channel quality indicator (CQI) feedback is dispatched in single input multiple output (SIMO) mode the format can be expanded to occupy 11 bits. These 11 bits may be used to enhance the scheduling of the CQI feedback reports. This may be accomplished by access terminal 404 providing CQI feedback of the scheduled downlink carrier along with information about which downlink carrier has the best CQI. In an aspect, for each reporting instance the report can employ 4 bits for the channel quality indicator (CQI) feedback of the appropriate carrier (e.g., according to the cycling rule), 4 bits for the channel quality indicator (CQI) of the best channel quality indicator carrier, and 3 bits for the index of the carrier. Additionally, it is possible to include 2 bits for the subband index of the best subband channel quality indicator (CQI) of the best CQI carrier. It is possible that access terminal 404 may also provide information about downlink carrier with the worst CQI. It should be noted in relation to sending channel quality indicator (CQI) feedback in single input multiple output (SIMO) mode, that overhead can be decreased because the frequency of the channel quality indicator (CQI) reporting can be decreased due to the additional reporting of the best carrier channel quality indicator (CQI) every reporting period.

According to an aspect, the asymmetric carrier component 408, for the wideband report per carrier, the CQI may include guard bands in case of contiguous carriers. If the carriers are not contiguous, then the CQI feedback will not cover the guard band portion.

According to another aspect, where more than one uplink (UL) carrier is paired with one downlink (DL) carrier, asymmetric carrier component 408 can utilize a strategy similar to that utilized by symmetric carrier component 406 where some uplink (UL) carriers may not be configured to carry channel quality indicator (CQI) feedback for some user equipment.

According to yet another aspect, the asymmetrical carrier component 408, like the symmetric carrier component 406, can ascertain whether or not access terminal 404 is power limited. Where asymmetrical carrier component 408 ascertains that access terminal 404 is power limited it can be indication that channel quality indicator (CQI) feedback needs to be dropped on all carriers, transmitted on one carrier, or dispatched on a subset of carriers.

According to an aspect, an aperiodic reporting component 410 is utilized to provide aperiodic reporting of reports. A periodic reporting occurs based on pre-determined period and the physical uplink control channel (PUCCH) is used to provide or transmit the reports to base station, whereas, the aperiodic reporting may be scheduled any time. Also, the aperiodic reports are dispatched via physical uplink shared channel (PUSCH). Where a physical uplink shared channel (PUSCH) is employed to send an aperiodic report, the report can include additional subband channel quality indicator (CQI) and subband precoding matrix indicator (PMI) information for each carrier. Accordingly, in order to effectuate this aspect of the claim matter, aperiodic reporting component 410 can poll for aperiodic requests in the uplink (UL) assignment which can refer to the channel quality indicator (CQI), precoding matrix indicator (PMI), or rank indicator (RI) report for the downlink (DL) carriers that the uplink (UL) is configured to send feedback for, or all configured downlink (DL) carriers. An additional bit in the uplink (UL) assignment can be employed to provide this information dynamically or radio resource control signaling can configure the default operation.

Referring to FIGS. 5-8, methodologies relating to providing channel quality indicator (CQI) feedback for multicarrier systems in an LTE based wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Figure 5:
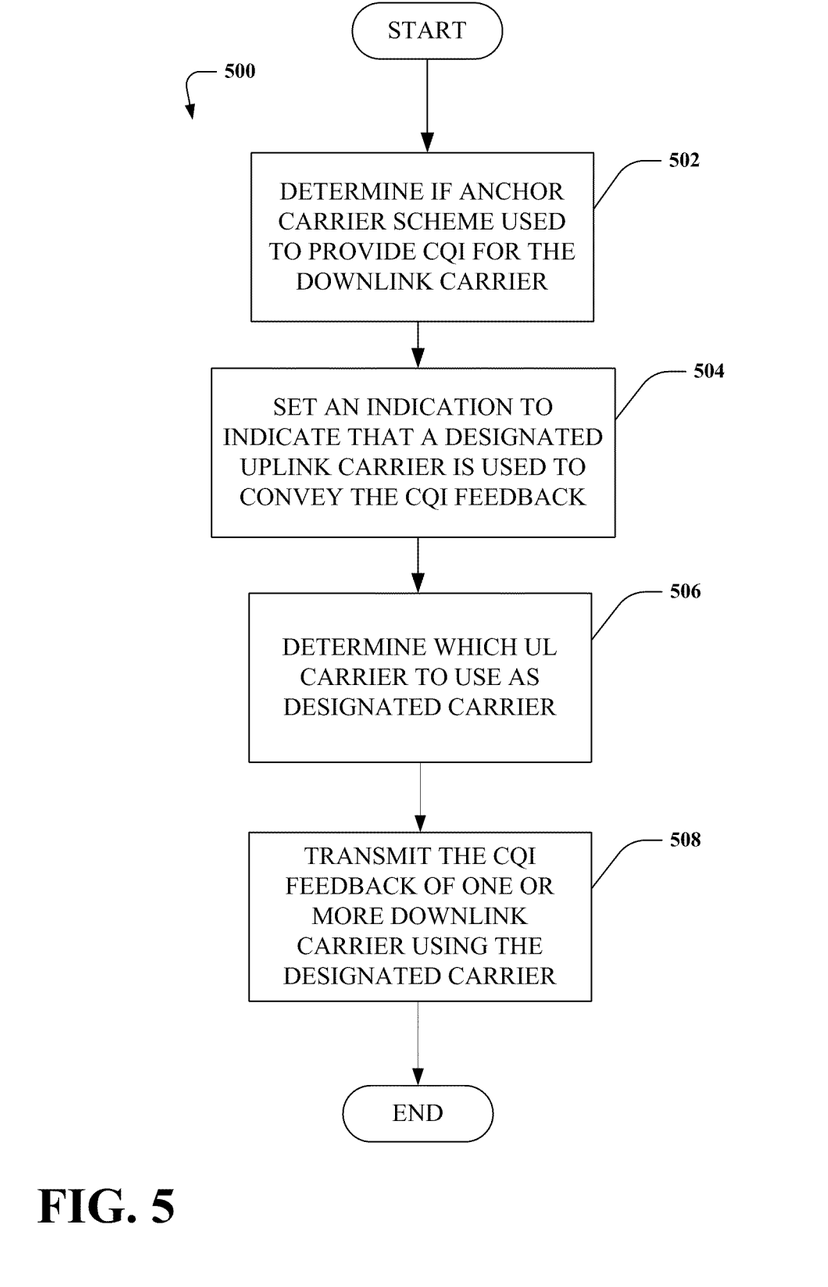
FIG. 5 illustrates a methodology that dispatches channel quality indicator (CQI) feedback for multicarrier systems in accordance with an aspect of the claimed subject matter.

With reference to FIG. 5, illustrated is a methodology 500 that provides channel quality indicator (CQI) feedback for multicarrier systems in accordance with an aspect of the claimed subject matter. As depicted, methodology 500 can commence at 502 where a determination can be made regarding whether the anchor carrier scheme is used to provide the CQI for the downlink carrier. At 504, if determined that the anchor carrier scheme is used, then set a flag or other indication to indicate that a designated carrier is used to provide CQI feedback for the downlink carriers. The anchor carrier scheme can be multicarrier system having an asymmetric configuration, wherein the designated or anchor uplink carrier is used to provide CQI and the designated or anchor carrier is not paired with the downlink carriers. At 506, one of the uplink carriers is designated as the anchor carrier. This determination can be dynamic or semi-static base on various factors, for example based on power of the access terminal. At 508, after cycling through all the downlink carriers to collect the CQI feedback, transmit the CQI feedback of one or more downlink carrier using the designated carrier.

Figure 6:
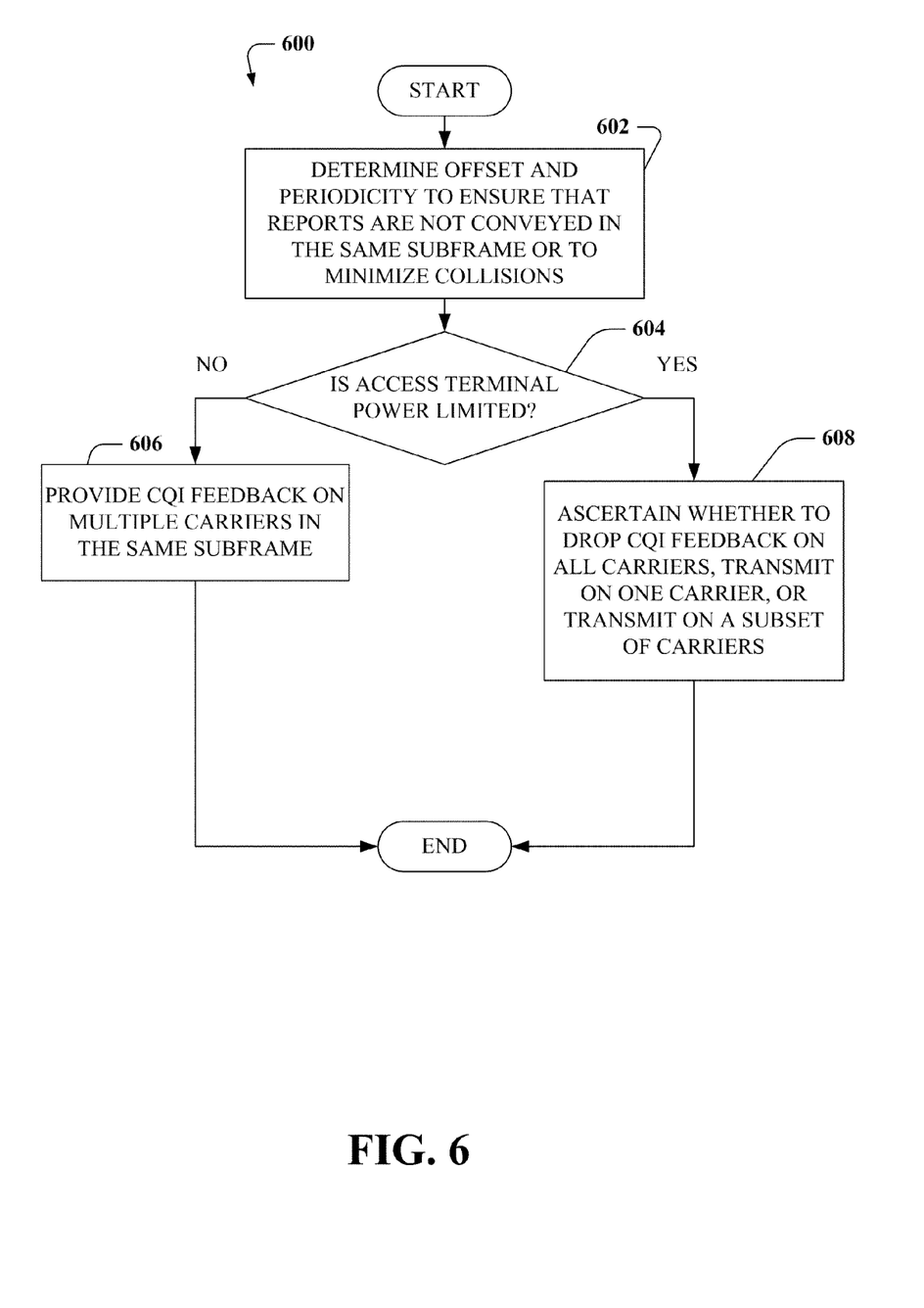
FIG. 6 illustrates a methodology that dispatches channel quality indicator (CQI) feedback for multicarrier systems in accordance with an aspect of the claimed subject matter.

With reference to FIG. 6, illustrated is a methodology 600 that provides channel quality indicator (CQI) feedback for multicarrier systems in accordance with an aspect of the claimed subject matter. As depicted, methodology 600 can commence at 602 where a determination can be made regarding offset and periodicity to ensure that reports are not conveyed in the same subframe or to at least mitigate collisions. At 604 a determination can be made regarding whether or not user equipment or access terminals are power limited. If it is determined at 604 that user equipment or access terminals are not power limited, methodology 600 can proceed to 606 where channel quality indicator (CQI) feedback can be provided on multiple carrier in the same subframe. On the other hand, if it is ascertained at 604 that user equipment or access terminals are power limited, the methodology 600 proceeds to 608 whereupon a determination can be made as to whether to drop channel quality indicator (CQI) feedback on all carriers, transmit channel quality indicator (CQI) feedback on one carrier, or disseminate channel quality indicator (CQI) feedback on a subset of carriers.

Figure 7:
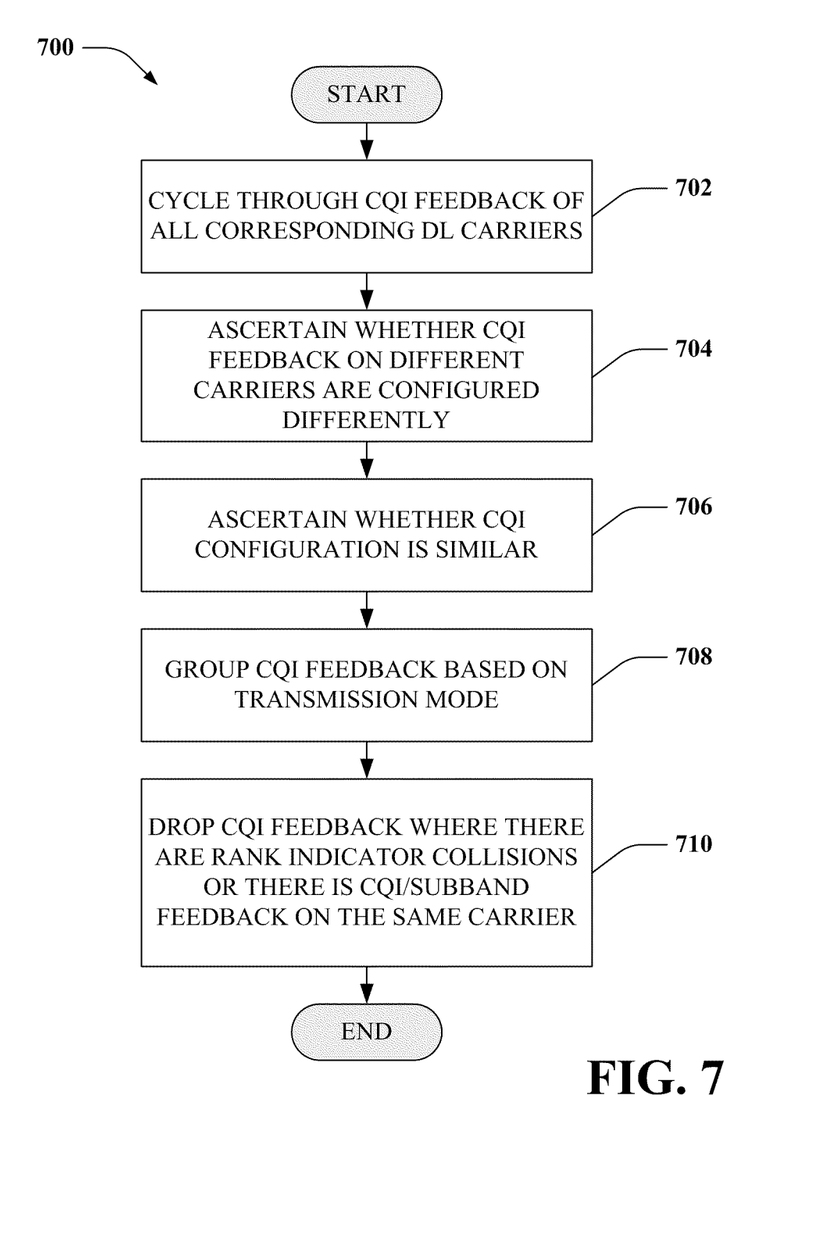
FIG. 7 illustrates a methodology that can be utilized to provide channel quality indicator (CQI) feedback for multicarrier systems in an LTE based wireless communication environment.

With reference to FIG. 7, illustrated is a further methodology 700 that can be utilized to provide channel quality indicator (CQI) feedback for multicarrier systems in accordance with an aspect of the claimed subject matter. Methodology 700 can cycle through channel quality indicator (CQI) feedback of all corresponding downlink (DL) carriers at 702. At 704, the methodology can ascertain whether or not channel quality indicator (CQI) feedback on different carriers are configured differently in which case upper layer configuration needs to be available for each carrier. At 706, a determination can be made as to whether or not channel quality indicator (CQI) feedback configuration is similar, in which case only one set of configuration parameters from upper layers is necessary. At 708, channel quality indicator (CQI) feedback can be grouped depending on the transmission mode (e.g., single input multiple output, multiple input multiple output, . . . ) on the corresponding carriers. Further, at 710 channel quality indicator (CQI) feedback can be dropped in the case of collision of rank indicator (RI) and wideband channel quality indicator (CQI)/subband channel quality indicator (CQI) feedback on the same carrier.

Figure 8:
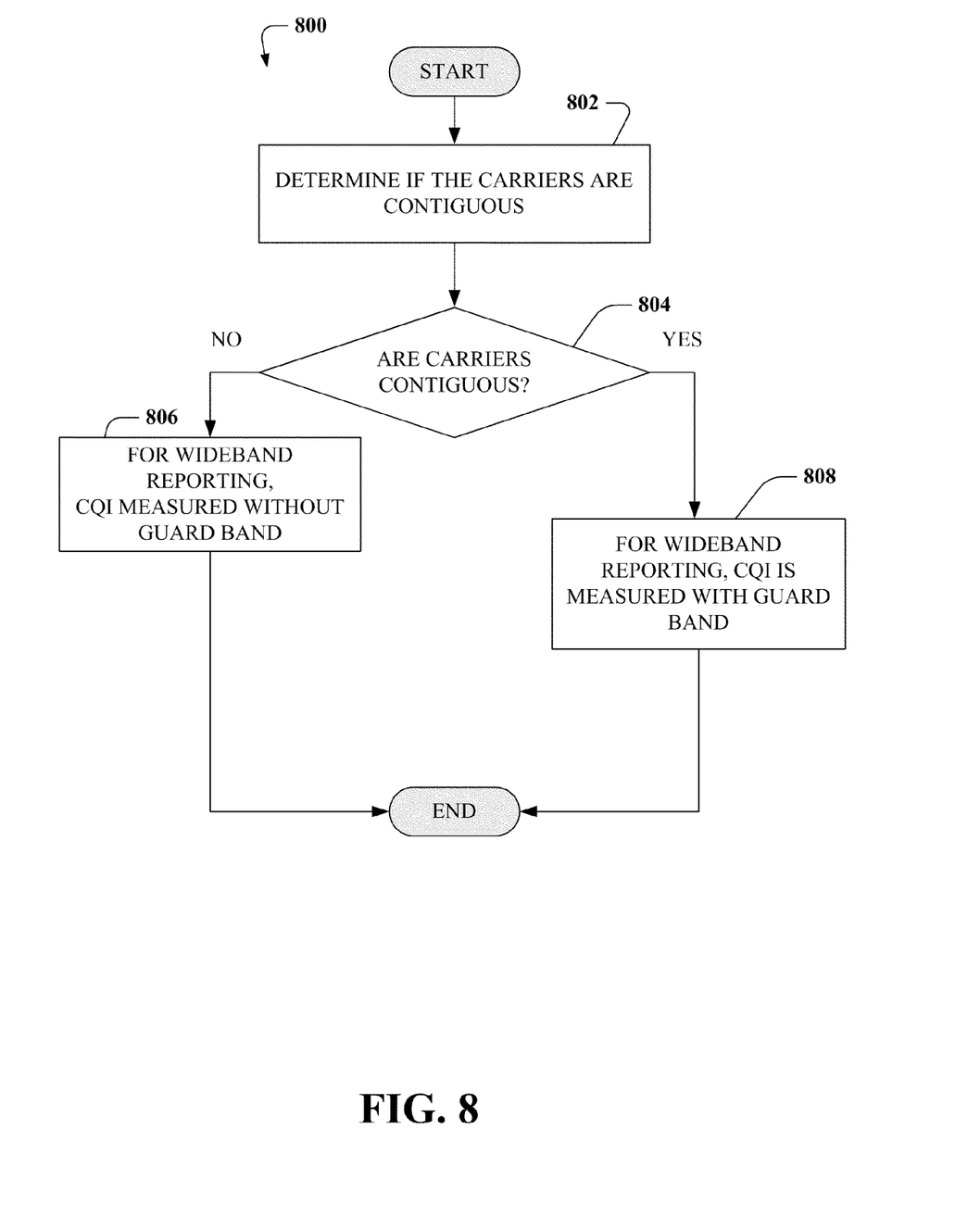
FIG. 8 illustrates a methodology that dispatches channel quality indicator (CQI) feedback for multicarrier systems in accordance with an aspect of the claimed subject matter.

With reference to FIG. 8, illustrated is a methodology 800 that provides channel quality indicator (CQI) feedback for multicarrier systems in accordance with an aspect of the claimed subject matter. The methodology commences at 802 by determining if the carriers for wideband reporting are contiguous. If at 804, it is determined that carriers are contiguous, then at 808 the entire carrier including the guard band portion is used to measure the CQI. Otherwise, at 810 the CQI is measured without using the guard band portion.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by processors.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. An apparatus employed in wireless communications using a multicarrier system, the apparatus comprising:
    means for determining an uplink anchor carrier for feedback reporting for a plurality of downlink carriers;
    means for determining that channel quality indicator (CQI) feedback for different downlink carriers of the plurality of downlink carriers is configured separately based on corresponding upper layer CQI feedback configurations for the different downlink carriers, wherein each corresponding upper layer CQI feedback configuration comprises a set of configuration parameters for providing the CQI feedback;

means for determining, when reporting the separately configured CQI feedback for the different downlink carriers of the plurality of downlink carriers on the uplink anchor carrier, a collision between a rank indicator and the CQI feedback; and means for dropping the CQI feedback based at least in part on the determining of the collision.

2. The apparatus of claim 1, further comprising:
means for measuring channel quality for a subset of the plurality of downlink carriers.

3. The apparatus of claim 2, further comprising:
means for cycling through the subset of the plurality of downlink carriers for reporting the measured channel quality for each downlink carrier.

4. The apparatus of claim 1, further comprising:
means for determining CQI of a subset of the plurality of downlink carriers; and
means for identifying a best carrier, wherein the best carrier is the downlink carrier from the subset of the plurality of downlink carriers with best CQI feedback.

5. The apparatus of claim 4, further comprising:
means for transmitting information about the best carrier.

6. The apparatus of claim 4, wherein the CQI feedback of the best carrier is transmitted at each reporting instance together with a regularly scheduled CQI feedback of a carrier according to a cycling rule.

7. The apparatus of claim 1, further comprising:
means for measuring channel quality with a guard band if it is determined that the plurality of downlink carriers are contiguous.

8. The apparatus of claim 1, further comprising:
means for measuring channel quality without a guard band, if it is determined that the plurality of downlink carriers are not contiguous.

9. The apparatus of claim 1, further comprising:
means for grouping the CQI feedback for multiple carriers of the plurality of downlink carriers based on transmission mode of the plurality of downlink carriers.

10. The apparatus of claim 1, further comprising:
means for transmitting an indication using one or more uplink resources.

11. The apparatus of claim 1, further comprising means for determining the uplink anchor carrier using one or more factors.

12. The apparatus of claim 1, wherein the CQI feedback comprises a wideband channel quality indicator.

13. The apparatus of claim 1, wherein the CQI feedback comprises a subband channel quality indicator.

14. The apparatus of claim 1, further comprising means for transmitting the feedback on a physical uplink control channel (PUCCH).

15. The apparatus of claim 1, wherein the collision is based at least in part on a plurality of reports that occur in a same subframe.

16. A method for use in wireless communications using a multicarrier system, the method comprising:
determining an uplink anchor carrier for feedback reporting for a plurality of downlink carriers;
determining that channel quality indicator (CQI) feedback for different downlink carriers of the plurality of downlink carriers is configured separately based on corresponding upper layer CQI feedback configurations for the different downlink carriers, wherein each corresponding upper layer CQI feedback configuration comprises a set of configuration parameters for providing the CQI feedback;
determining, when reporting the separately configured CQI feedback for the different downlink carriers of the plurality of downlink carriers on the uplink anchor carrier, a collision between a rank indicator and the CQI feedback; and
dropping the CQI feedback based at least in part on the determining of the collision.

17. The method of claim 16, further comprising:
measuring channel quality for all the downlink carriers from the plurality of downlink carriers.

18. The method of claim 17, further comprising:
cycling through the plurality of downlink carriers for measuring the channel quality for each downlink carrier.

19. The method of claim 16, further comprising:
determining CQI of all the downlink carriers from the plurality of downlink carriers; and
identifying a best carrier, wherein the best carrier is the downlink carrier from the plurality of downlink carriers with best CQI feedback.

20. The method of claim 19, further comprising:
transmitting information about the best carrier.

21. The method of claim 16, further comprising:
measuring channel quality with a guard band if it is determined that the plurality of downlink carriers are contiguous.

22. The method of claim 16, further comprising:
measuring channel quality without a guard band, if it is determined that the plurality of downlink carriers are not contiguous.

23. The method of claim 16, further comprising:
grouping the CQI feedback based on transmission mode of the plurality of downlink carriers.

24. The method of claim 16, further comprising:
transmitting an indication using one or more uplink resources, wherein the indication identifies that the uplink anchor carrier is used to convey the feedback.

25. The method of claim 16, further comprising determining the uplink anchor carrier using one or more factors.

26. The method of claim 16, wherein the CQI feedback comprises a wideband channel quality indicator.

27. The method of claim 16, wherein the CQI feedback comprises a subband channel quality indicator.

28. The method of claim 16, further comprising transmitting the feedback on a physical uplink control channel (PUCCH).

29. The method of claim 16, wherein the collision is based at least in part on a plurality of reports that occur in a same subframe.

30. An apparatus used in wireless communications using a multicarrier system, the apparatus comprising:
at least one processor coupled to a memory, the memory storing instructions that are executable by the processor to determine an uplink anchor carrier for feedback reporting for a plurality of downlink carriers, to determine that channel quality indicator (CQI) feedback for different downlink carriers of the plurality of downlink carriers is configured separately based on corresponding upper layer CQI feedback configurations for the different downlink carriers, wherein each corresponding upper layer CQI feedback configuration comprises a set of configuration parameters for providing the CQI feedback, to determine, when reporting the separately configured CQI feedback for the different downlink carriers of the plurality of downlink carriers on the uplink anchor carrier, a collision between a rank indicator and the CQI feedback, and to drop the CQI feedback based at least in part on the determining of the collision.

31. The apparatus of claim 30, wherein the at least one processor is configured to measure channel quality for each of the plurality of downlink carriers.

32. The apparatus of claim 31, wherein the at least one processor is configured to cycle through the plurality of downlink carriers for measuring the channel quality for each downlink carrier.

33. A computer program product, comprising:
- a non-transitory computer-readable medium comprising:
    - code for determining an uplink anchor carrier for feedback reporting for a plurality of downlink carriers;
    - code for determining that channel quality indicator (CQI) feedback for different downlink carriers of the plurality of downlink carriers is configured separately based on corresponding upper layer CQI feedback configurations for the different downlink carriers, wherein each corresponding upper layer CQI feedback configuration comprises a set of configuration parameters for providing the CQI feedback;
    - code for determining, when reporting the separately configured CQI feedback for the different downlink carriers of the plurality of downlink carriers on the uplink anchor carrier, a collision between a rank indicator and the CQI feedback; and
    - code for dropping the CQI feedback based at least in part on the determining of the collision.

* * * * *